United States Patent
Sorensen, Jr. et al.

(10) Patent No.: US 11,084,988 B2
(45) Date of Patent: Aug. 10, 2021

(54) PROCESSES FOR CONVERTING BIOMASS TO BTX WITH LOW SULFUR, NITROGEN AND OLEFIN CONTENT VIA A CATALYTIC FAST PYROLYSIS PROCESS

(71) Applicant: Anellotech, Inc., Pearl River, NY (US)

(72) Inventors: Charles M. Sorensen, Jr., Haverstraw, NY (US); Ruozhi Song, Maple Valley, WA (US); Terry J. Mazanec, Solon, OH (US)

(73) Assignee: Anellotech, Inc., Pearl River, NY (US)

( * ) Notice: Subject to any disclaimer, the term of this patent is extended or adjusted under 35 U.S.C. 154(b) by 0 days.

(21) Appl. No.: 16/531,096

(22) Filed: Aug. 4, 2019

(65) Prior Publication Data
US 2020/0040265 A1    Feb. 6, 2020

Related U.S. Application Data

(62) Division of application No. 14/789,603, filed on Jul. 1, 2015, now Pat. No. 10,370,601.
(Continued)

(51) Int. Cl.
*C10L 1/04* (2006.01)
*C10L 10/12* (2006.01)
(Continued)

(52) U.S. Cl.
CPC ............. *C10G 45/32* (2013.01); *C10G 1/002* (2013.01); *C10G 1/08* (2013.01); *C10G 1/10* (2013.01);
(Continued)

(58) Field of Classification Search
CPC .......... C10G 45/32; C10G 1/002; C10G 1/08; C10G 1/10; C10G 3/42; C10G 45/02;
(Continued)

(56) References Cited

U.S. PATENT DOCUMENTS 3,625,879 A   12/1971  Horne et al.
4,059,504 A   11/1977  Bauer
(Continued)

FOREIGN PATENT DOCUMENTS

CN    103131456 A  *  6/2013
CN    102942947 A     9/2014
(Continued)

OTHER PUBLICATIONS

"Optimizing the Aromatic Yield and Distribution from Catalytic Fast Pyrolysis of Biomass over ZDM-5" A.J. Foster, Jungho Jae, Yu Ting heng, George W Huber and Raul F Lobo / Applied Catalysis A: General 423-424 (2012) 154-161 (Year: 2012).*
(Continued)

*Primary Examiner* — Pamela H Weiss
(74) *Attorney, Agent, or Firm* — Frank Rosenberg

(57) ABSTRACT

Methods of separating and purifying products from the catalytic fast pyrolysis of biomass are described. In a preferred method, a portion of the products from a pyrolysis reactor are recovered and purified using a hydrotreating step that reduces the content of sulfur, nitrogen, and oxygen components, and hydrogenates olefins to produce aromatic products that meet commercial quality specifications.

10 Claims, 5 Drawing Sheets

Related U.S. Application Data

(60) Provisional application No. 62/019,868, filed on Jul. 1, 2014.

(51) Int. Cl.
| | |
|---|---|
| *C10G 45/32* | (2006.01) |
| *C10G 45/02* | (2006.01) |
| *C10G 1/00* | (2006.01) |
| *C10G 1/08* | (2006.01) |
| *C10G 1/10* | (2006.01) |
| *C10G 3/00* | (2006.01) |

(52) U.S. Cl.
CPC ............. *C10G 3/42* (2013.01); *C10G 45/02* (2013.01); *C10L 1/04* (2013.01); *C10L 10/12* (2013.01); *C10G 2400/30* (2013.01); *C10L 2200/0469* (2013.01); *C10L 2270/04* (2013.01); *C10L 2290/02* (2013.01); *C10L 2290/54* (2013.01); *Y02P 30/20* (2015.11)

(58) Field of Classification Search
CPC ....... C10G 2400/30; C10L 1/04; C10L 10/12; C10L 2200/0469; C10L 2270/04; C10L 2290/02; C10L 2290/54; Y02P 30/20; C07C 15/00; C07C 15/02; C07C 15/12; C07C 15/20; C07C 15/40
See application file for complete search history.

(56) References Cited

U.S. PATENT DOCUMENTS

| | | | |
|---|---|---|---|
| 5,279,646 A | 1/1994 | Schwab | |
| 8,277,643 B2 | 10/2012 | Huber et al. | |
| 8,748,680 B2 | 6/2014 | Hogendoorn et al. | |
| 8,962,901 B2 | 2/2015 | Kim | |
| 2003/0115792 A1* | 6/2003 | Shabtai | C10G 65/12 44/605 |
| 2006/0115792 A1* | 6/2006 | Vuillemot | A61K 6/887 433/215 |
| 2008/0076945 A1 | 3/2008 | Marker et al. | |
| 2009/0227823 A1* | 9/2009 | Huber | C10G 1/08 585/324 |
| 2011/0230693 A1 | 9/2011 | Reilly et al. | |
| 2011/0275869 A1 | 11/2011 | Prochazka et al. | |
| 2011/0282079 A1* | 11/2011 | Sen | C10L 1/1855 549/489 |
| 2012/0116138 A1 | 5/2012 | Goodall et al. | |
| 2012/0152801 A1 | 6/2012 | Bozzano et al. | |
| 2013/0030228 A1 | 1/2013 | Chen | |
| 2013/0060070 A1* | 3/2013 | Huber | C10G 1/002 585/242 |
| 2013/0130345 A1* | 5/2013 | Thai | C07C 4/06 435/166 |
| 2013/0152458 A1 | 6/2013 | Flowers et al. | |
| 2013/0197290 A1 | 8/2013 | Domokos et al. | |
| 2013/0205651 A1 | 8/2013 | Wang | |
| 2013/0289324 A1* | 10/2013 | Price | B01J 29/084 585/469 |
| 2013/0324772 A1* | 12/2013 | Huber | B01J 29/40 585/242 |
| 2014/0107306 A1* | 4/2014 | Mazanec | C07C 2/66 526/346 |

FOREIGN PATENT DOCUMENTS

| | | | |
|---|---|---|---|
| CN | 102942947 B | * | 9/2014 |
| EP | 0118310 A2 | | 9/1984 |
| EP | 0418622 A2 | * | 3/1991 ............... C10G 7/08 |

OTHER PUBLICATIONS

"Production of Renewable Aromatic Compounds by Catalytic Fast Pyrolysis fo Lignocellulosic Biomass with Bifunctional Ba/ZSM-5 Catalysts" Yu-Ting Chen, Junho Jae, Jian Shi, Wei Fan, George Huber AngewChem Ind Ed (2102) 51, 1387-1390 (Year: 2012).*
Effect of Crystal Size of ZSM-5 on the Aromatic Yield and Selectivity from Catalytic Fast Pyrolysis of Biomass Anqing Zheng Zengli Zhao Sheng Chang, Zhen huang, Journal of Molecular Catlysis A: Chemical (available online Nov. 21, 2013) Journal of Molecular Catalysis A chemical 384-384 (2014) 23-30 (Year: 2013).*
"Production of Four Selected Renewable Aromatic Chemicals" Niklas Eriksson Department of Chemical Engineering Division of Forest Products and Chemical Engineering Chalmers University of Technology Gothenburg Sweden (2013) (Year: 2013).*
Office Action from Brazilian Application No. BR112016030711-9, dated Feb. 1, 2020.
Office Action from European Application No. 15 750 843.3, dated Feb. 3, 2020.
International Preliminary Report on Patentability from PCT Application No. PCT/US2015/038833, dated Jan. 3, 2017.
Second Office Action from Chinese Application No. 201580035953. 4, dated Nov. 6, 2018.
Translation of Second Office Action from Chinese Application No. 201580035953.4, dated Nov. 6, 2018.
Office Action from Japanese Application No. JP2017-521036, dated Jun. 11, 2019.
Translation of Office Action from Japanese Application No. JP2017-521036, dated Jun. 11, 2019.
Second Office Action from Japanese Application No. JP2017-521036, dated May 11, 2020.
Machine translation of 2nd Office Action from Japanese Application No. JP2017-521036, dated May 11, 2020.
Bridgewater, A.V. et al., "Fast Pyrolysis Processes for biomass", Renewable and Sustainable Energy Reviews 4 (2000) 1-73.
Huber, G.W. et al., "Synthesis of Transportation Fuels from Biomass: Chem. Catalyst, & Engineering" Chem. Rev. 106 (2006) pp. 4044-4098.
International Search Report and Written Opinion of the International Searching Authority from International Application No. PCT/US2015/038833.
Notice of First Office Action from Chinese Patent application No. CN201580035953.4 dated Feb. 26, 2018.
Machine translation of CN102942947A.
First Office Action from European Application No. EP 15 750 843.3, dated Nov. 15, 2017.
Second Office Action from European Application No. EP 15 750 843.3, dated Dec. 19, 2018.
Fourth Office Action from European Application No. EP 15 750 843.3, dated Jan. 25, 2021.
Translation of 2nd Office Action from Japanese Application No. JP2017-521036, dated May 11, 2020.
First Office Action from Australian Application No. AU 2015285114, dated Mar. 25, 2019.
Second Office Action from Australian Application No. AU 2015285114, dated Oct. 31, 2019.
First Office Action from Australian Application No. AU 2020200798, dated Mar. 12, 2021.
Office Action from Malaysian Application No. MY PI 2016704868, dated Aug. 27, 2020.

* cited by examiner

| Stream label in Fig 3 | 10 | 11 | 12 | 16 | 17 | 18 | 19 | 13 | 20 | 14 | 22 | 15 | 5 |
|---|---|---|---|---|---|---|---|---|---|---|---|---|---|
| Pressure, kPa | 441 | 401 | 371 | 371 | 371 | 391 | 371 | 1101 | 901 | 901 | 1001 | 850 | 801 |
| Temperature, C | 578 | 475 | 56 | 115 | 115 | 40 | 115 | 164 | 5 | 5 | 5 | 6 | 8 |
| H2 | 0.41 | 0.41 | 0.51 | 0.00 | 0.00 | 0.00 | 0.00 | 0.51 | 0.00 | 0.58 | 0.00 | 0.00 | 0.59 |
| CO | 36.16 | 36.16 | 45.10 | 0.07 | 0.07 | 0.07 | 0.03 | 45.10 | 1.15 | 51.50 | 0.00 | 1.01 | 51.96 |
| CO2 | 25.44 | 25.44 | 31.63 | 0.44 | 0.44 | 0.44 | 0.39 | 31.63 | 5.78 | 35.49 | 0.00 | 4.94 | 35.53 |
| CH4 | 4.98 | 4.98 | 6.20 | 0.01 | 0.01 | 0.01 | 0.02 | 6.20 | 0.49 | 7.06 | 0.00 | 0.48 | 7.10 |
| Propane | 0.08 | 0.08 | 0.10 | 0.00 | 0.00 | 0.00 | 0.00 | 0.10 | 0.06 | 0.11 | 0.00 | 0.05 | 0.10 |
| Ethylene | 2.08 | 2.08 | 2.59 | 0.00 | 0.00 | 0.00 | 0.03 | 2.59 | 0.21 | 2.95 | 0.00 | 0.32 | 2.96 |
| Propylene | 0.99 | 0.99 | 1.24 | 0.00 | 0.00 | 0.00 | 0.02 | 1.24 | 0.55 | 1.36 | 0.00 | 0.53 | 1.33 |
| C4-C7 olefins | 0.11 | 0.11 | 0.14 | 0.00 | 0.00 | 0.00 | 0.01 | 0.14 | 0.62 | 0.09 | 0.00 | 0.33 | 0.06 |
| C4-C7 paraffins | 0.12 | 0.12 | 0.15 | 0.01 | 0.01 | 0.01 | 0.02 | 0.15 | 0.62 | 0.09 | 0.37 | 0.57 | 0.08 |
| Benzene | 2.51 | 2.51 | 3.13 | 0.01 | 0.00 | 0.00 | 0.65 | 3.13 | 27.13 | 0.48 | 0.00 | 7.13 | 0.00 |
| Toluene | 3.74 | 3.74 | 4.63 | 0.01 | 0.00 | 0.00 | 2.13 | 4.63 | 44.51 | 0.22 | 10.96 | 11.45 | 0.07 |
| p-Xylene | 0.46 | 0.46 | 0.56 | 0.00 | 0.00 | 0.00 | 0.94 | 0.56 | 5.54 | 0.01 | 26.58 | 21.80 | 0.05 |
| m-Xylene | 0.69 | 0.69 | 0.84 | 0.01 | 0.00 | 0.00 | 1.45 | 0.84 | 8.30 | 0.01 | 38.74 | 31.84 | 0.07 |
| o-Xylene | 0.18 | 0.18 | 0.22 | 0.00 | 0.00 | 0.00 | 0.58 | 0.22 | 2.19 | 0.00 | 10.83 | 8.98 | 0.01 |
| Ethylbenzene | 0.07 | 0.07 | 0.09 | 0.00 | 0.00 | 0.00 | 0.13 | 0.09 | 0.87 | 0.00 | 4.20 | 3.46 | 0.01 |
| Propylbenzene | 0.00 | 0.00 | 0.00 | 0.00 | 0.00 | 0.00 | 0.02 | 0.00 | 0.01 | 0.00 | 0.07 | 0.06 | 0.00 |
| Cumene | 0.06 | 0.06 | 0.07 | 0.00 | 0.00 | 0.00 | 0.33 | 0.07 | 0.74 | 0.00 | 3.77 | 3.15 | 0.00 |
| 1,2,3-trimethylbenzene | 0.05 | 0.05 | 0.02 | 0.01 | 0.00 | 0.00 | 2.72 | 0.02 | 0.16 | 0.00 | 0.76 | 0.64 | 0.00 |
| Styrene | 0.05 | 0.05 | 0.06 | 0.00 | 0.00 | 0.00 | 0.20 | 0.06 | 0.58 | 0.00 | 2.87 | 2.39 | 0.00 |
| Benzofuran | 0.02 | 0.02 | 0.00 | 0.06 | 0.06 | 0.06 | 0.39 | 0.00 | 0.04 | 0.00 | 0.20 | 0.17 | 0.00 |
| Aniline | 0.01 | 0.01 | 0.00 | 0.03 | 0.03 | 0.03 | 0.24 | 0.00 | 0.02 | 0.00 | 0.08 | 0.06 | 0.00 |
| Indole | 0.01 | 0.01 | 0.00 | 0.03 | 0.03 | 0.03 | 0.35 | 0.00 | 0.00 | 0.00 | 0.00 | 0.00 | 0.00 |
| Indene | 0.02 | 0.02 | 0.00 | 0.01 | 0.00 | 0.00 | 1.67 | 0.00 | 0.01 | 0.00 | 0.06 | 0.05 | 0.00 |
| Naphthalene | 0.80 | 0.80 | 0.00 | 0.23 | 0.01 | 0.01 | 66.13 | 0.00 | 0.01 | 0.00 | 0.01 | 0.01 | 0.00 |
| 2-Methylnaphthalene | 0.40 | 0.40 | 0.01 | 1.15 | 1.10 | 1.10 | 15.23 | 0.01 | 0.07 | 0.00 | 0.02 | 0.02 | 0.00 |
| Phenol | 0.05 | 0.05 | 0.00 | 0.23 | 0.23 | 0.23 | 0.57 | 0.00 | 0.03 | 0.00 | 0.15 | 0.12 | 0.00 |
| m-Cresol | 0.17 | 0.17 | 0.01 | 0.53 | 0.51 | 0.51 | 5.20 | 0.01 | 0.10 | 0.00 | 0.33 | 0.28 | 0.00 |
| Water | 20.32 | 20.32 | 2.69 | 97.15 | 97.48 | 97.48 | 0.58 | 2.69 | 0.16 | 0.07 | 0.00 | 0.13 | 0.06 |
| TOTAL | 100.00 | 100.00 | 100.00 | 100.00 | 100.00 | 100.00 | 100.00 | 100.00 | 100.00 | 100.00 | 100.00 | 100.00 | 100.00 |

FIG. 4

| Stream label in Fig 4 | 20 | 15 | 23 | 21 | 24 | 25 | 6 | 26 | 27 | 28 | 22 |
|---|---|---|---|---|---|---|---|---|---|---|---|
| Pressure, kPa | 901 | 850 | 201 | 306 | 315 | 420 | 201 | 201 | 201 | 1101 | 1101 |
| Temperature, C | 5 | 6 | 5 | 135 | 183 | 242 | 5 | 5 | 5 | 60 | 60 |
| H2 | 0.00 | 0.00 | 0.00 | 0.00 | 0.00 | 0.00 | 0.00 | 0.00 | 0.00 | 0.00 | 0.00 |
| CO | 1.15 | 1.01 | 0.11 | 0.72 | 0.00 | 0.00 | 16.95 | 0.28 | 0.11 | 0.00 | 0.00 |
| CO2 | 5.78 | 4.94 | 3.10 | 5.28 | 0.00 | 0.00 | 63.57 | 1.99 | 3.11 | 0.00 | 0.00 |
| CH4 | 0.49 | 0.48 | 0.13 | 0.37 | 0.00 | 0.00 | 6.83 | 0.03 | 0.13 | 0.00 | 0.00 |
| Propane | 0.06 | 0.05 | 0.07 | 0.08 | 0.00 | 0.00 | 0.38 | 0.10 | 0.07 | 0.00 | 0.00 |
| Ethylene | 0.21 | 0.32 | 0.06 | 0.19 | 0.00 | 0.00 | 3.63 | 0.00 | 0.06 | 0.00 | 0.00 |
| Propylene | 0.55 | 0.53 | 0.52 | 0.66 | 0.00 | 0.00 | 4.56 | 0.01 | 0.52 | 0.00 | 0.00 |
| C4-C7 olefins | 0.62 | 0.33 | 0.96 | 0.94 | 0.00 | 0.00 | 0.44 | 0.21 | 0.96 | 0.00 | 0.00 |
| C4-C7 paraffins | 0.62 | 0.57 | 0.82 | 0.80 | 0.37 | 0.01 | 0.46 | 0.32 | 0.82 | 0.37 | 0.37 |
| Benzene | 27.13 | 7.13 | 38.80 | 37.46 | 0.00 | 0.00 | 2.12 | 0.07 | 38.85 | 0.00 | 0.00 |
| Toluene | 44.51 | 11.45 | 54.48 | 52.52 | 10.96 | 0.13 | 0.81 | 0.02 | 54.55 | 10.96 | 10.96 |
| p-Xylene | 5.54 | 21.80 | 0.11 | 0.11 | 26.58 | 4.93 | 0.00 | 0.00 | 0.12 | 26.58 | 26.58 |
| m-Xylene | 8.30 | 31.84 | 0.49 | 0.47 | 38.74 | 6.88 | 0.00 | 0.00 | 0.49 | 38.74 | 38.74 |
| o-Xylene | 2.19 | 8.98 | 0.02 | 0.02 | 10.83 | 3.53 | 0.00 | 0.00 | 0.02 | 10.83 | 10.83 |
| Ethylbenzene | 0.87 | 3.46 | 0.02 | 0.02 | 4.20 | 0.77 | 0.00 | 0.00 | 0.02 | 4.20 | 4.20 |
| Propylbenzene | 0.01 | 0.06 | 0.00 | 0.00 | 0.07 | 0.11 | 0.00 | 0.00 | 0.00 | 0.07 | 0.07 |
| Cumene | 0.74 | 3.15 | 0.00 | 0.00 | 3.77 | 1.86 | 0.00 | 0.00 | 0.00 | 3.77 | 3.77 |
| 1,2,3-trimethylbenzene | 0.16 | 0.64 | 0.00 | 0.00 | 0.76 | 6.55 | 0.00 | 0.00 | 0.00 | 0.76 | 0.76 |
| Styrene | 0.58 | 2.39 | 0.01 | 0.00 | 2.87 | 0.81 | 0.00 | 0.00 | 0.01 | 2.87 | 2.87 |
| Benzofuran | 0.04 | 0.17 | 0.00 | 0.00 | 0.20 | 0.85 | 0.00 | 0.00 | 0.00 | 0.20 | 0.20 |
| Aniline | 0.02 | 0.06 | 0.00 | 0.00 | 0.08 | 0.48 | 0.00 | 0.00 | 0.00 | 0.08 | 0.08 |
| Indole | 0.00 | 0.00 | 0.00 | 0.00 | 0.00 | 0.51 | 0.00 | 0.00 | 0.00 | 0.00 | 0.00 |
| Indene | 0.01 | 0.05 | 0.00 | 0.00 | 0.06 | 1.27 | 0.00 | 0.00 | 0.00 | 0.06 | 0.06 |
| Naphthalene | 0.01 | 0.01 | 0.00 | 0.00 | 0.01 | 5.20 | 0.00 | 0.00 | 0.00 | 0.01 | 0.01 |
| 2-Methylnaphthalene | 0.07 | 0.02 | 0.00 | 0.00 | 0.02 | 44.45 | 0.00 | 0.00 | 0.00 | 0.02 | 0.02 |
| Phenol | 0.03 | 0.12 | 0.00 | 0.00 | 0.15 | 0.32 | 0.00 | 0.00 | 0.00 | 0.15 | 0.15 |
| m-Cresol | 0.10 | 0.28 | 0.00 | 0.00 | 0.33 | 21.35 | 0.00 | 0.00 | 0.00 | 0.33 | 0.33 |
| Water | 0.16 | 0.13 | 0.22 | 0.27 | 0.00 | 0.00 | 0.22 | 96.95 | 0.10 | 0.00 | 0.00 |
| TOTAL | 100.00 | 100.00 | 100.00 | 100.00 | 100.00 | 100.00 | 100.00 | 100.00 | 100.00 | 100.00 | 100.00 |

FIG. 5

PROCESSES FOR CONVERTING BIOMASS TO BTX WITH LOW SULFUR, NITROGEN AND OLEFIN CONTENT VIA A CATALYTIC FAST PYROLYSIS PROCESS

RELATED APPLICATIONS

This application is a divisional of U.S. patent application Ser. No. 14/789,603 filed Jul. 1, 2015, now U.S. Pat. No. 10,370,601 issued Aug. 6, 2019 and also claims priority to U.S. Provisional Patent Application No. 62/019,868 filed Jul. 1, 2014.

INTRODUCTION

Since the beginning of the Industrial Age, human desires for travel and consumer goods have driven the ever increasing consumption of fossil fuels such as coal and oil, typically obtained from deep underground. The extraction of fossil fuels by mining and drilling has often been accompanied by environmental and political costs. Furthermore, as the more accessible sources of fossil fuels are being used up; this has led to the pursuit of more expensive extraction technologies such as fracking and deep sea drilling. Additionally, the consumption of fossil fuels causes higher levels of atmospheric carbon, typically in the form of carbon dioxide.

To reduce these problems, there have been extensive efforts made in converting biomass to fuels and other useful chemicals. Unlike fossil fuels, biomass is renewable and carbon-neutral; that is, biomass-derived fuels and chemicals do not lead to increased atmospheric carbon since the growth of biomass consumes atmospheric carbon.

Much of the work on biomass has involved converting refined biomass including vegetable oils, starches, and sugars; however, since these types of refined biomass may alternatively be consumed as food, there is even a greater utility for converting non-food biomass such as agricultural waste (bagasse, straw, corn stover, corn husks, etc.), energy crops (like switch grass and saw grass), trees and forestry waste, such as wood chips and saw dust, waste from paper mills, plastic waste, recycled plastics or algae, in combination sometimes referred to as cellulosic biomass. This non-food biomass generally includes three main components: lignin, hemicellulose, and cellulose.

Generating fuels and chemicals from biomass requires specialized conversion processes different from conventional petroleum-based conversion processes due to the nature of the feedstock. High temperatures, solid feed, high concentrations of water, unusual separations, and oxygenated by-products are some of the features of biomass conversion that are distinct from those encountered in petroleum upgrading. Thus, there are many challenges that must be overcome to efficiently produce chemicals from biomass.

It is well known that a variety of biomass-derived polymeric materials such as lignin, cellulose, and hemi-cellulose, can be pyrolyzed to produce mixtures of aromatics, olefins, CO, CO2, water, and other products. A particularly desirable form of pyrolysis is known as catalytic fast pyrolysis (CFP) that involves the conversion of biomass in a catalytic fluid bed reactor to produce a mixture of aromatics, olefins, and a variety of other materials. The aromatics include benzene, toluene, xylenes, (collectively BTX), and naphthalene, among other aromatics. The olefins include ethylene, propylene, and lesser amounts of higher molecular weight olefins. BTX aromatics have high value and are easily transported.

Biomass contains small amounts of sulfur and nitrogen. The content of these heteroatoms varies widely depending on the source of the biomass and how it has been handled or processed.

The raw effluent from a CFP process is a complex mixture that comprises aromatics, olefins, oxygenates, paraffins, H2, CH4, CO, CO2, water, char, ash, coke, catalyst fines, organic sulfur and nitrogen compounds, and other compounds. Separation, recovery, and purification of the various components from this complex mixture present challenges that have not been solved satisfactorily.

Conventional processes for producing BTX utilize petroleum sources such as catalytic reformate or pyrolysis gasoline. For the production of chemical grade benzene, toluene, xylenes, and other products from these petroleum derived streams processes have been developed to reduce the content of sulfur, nitrogen, and olefinic impurities to meet industry standards.

In conventional BTX production from petroleum based feedstocks, a naphtha fraction from crude oil is separated by distillation, hydrotreated to provide low sulfur and nitrogen content, typically less than 1 ppm each, and then subjected to naphtha reforming to convert naphthenes, paraffins, and olefins to single ring aromatic products such as benzene and a variety of alkylated phenyl ring compounds. Organo-oxygen content in naphtha is very low and considered negligible (see, for example: Catalytic Naphtha Reforming, 2nd edition, G. J. Antos, A. M. Aitani, eds., Marcel Dekker, 2005). Hydrotreating naphtha prior to reforming protects the activity and lifetime of the noble metal reforming catalysts which are poisoned by sulfur compounds, and it also provides an aromatic-rich product low in undesired heteroatoms such as sulfur and nitrogen and low in undesired dienes which otherwise would contaminate downstream polymer product processes and products. Through a combination of liquid-liquid extraction, distillation, crystallization, and/or selective liquid-solid adsorption processes, the BTX aromatics in the reformate mixture are separated into high purity individual products of benzene, toluene, and xylene isomers of which p-xylene is the most valuable for polyesters. Purity of each individual aromatic product is typically 99.5% or higher. Organo-sulfur and -nitrogen content is below 1 part per million each. Diene and olefin content is typically measured using the Bromine Index test (mg of bromine reacting with 100 g of a material, ASTM D5776 and ASTM D1492). Typical specification for aromatic products require a Bromine Index value less than 100, and some products require no more than 20. There are no known specifications for organo-oxygen content in BTX products, probably because the occurrence levels are low in petroleum-derived processes.

Pyrolysis gasoline ("pygas"), produced as a by-product of hydrocarbon steam cracking to produce light olefins, is the second major source of BTX supply in industry today. Steam crackers convert ethane, propane, and/or butanes from natural gas and/or petroleum refining, or heavier C5+ hydrocarbon naphtha or distillate oil feeds from natural gas associated-liquids and petroleum sources to ethylene and propylene which are used downstream for polymer production. The pygas is rich in aromatics, especially benzene, contains substantial amounts of diene and cyclo-diene compounds, styrene, and cyclo-olefins, and may contain low levels of organo-sulfur compounds. Composition ranges are 30-80 wt % aromatics, 2-20 wt % mono olefins, 1-20 wt % di-olefins, and 40 to 3000 ppm sulfur (U.S. Pat. No. 4,059,504). Pygas is considered to have negligible amounts of organo-nitrogen and -oxygen compounds (U.S. Pat. No.

3,625,879). Primarily due to storage instability problems, pygas is typically hydrotreated to reduce diene and vinylaromatic content and this stabilizes the product against gum and tar formation. A second stage of hydrotreating can be used to reduce the sulfur levels to BTX aromatic product specifications.

The composition of the BTX containing stream produced from CFP is unlike the compositions of either catalytic reformate or pyrolysis gasoline and thus presents different challenges for purifying products therefrom. Purification of biomass derived BTX to acceptable levels of sulfur, nitrogen and olefin content from the product stream produced in a single step catalytic fast pyrolysis process has never been reported.

Purification of petroleum-derived BTX-rich process streams has been an active area of research and development for many years, but past processes have not been developed to effectively handle the unusual BTX mixture recovered and separated from the CFP process. Goodall et al in US Patent Application 2012/0116138A1 suggest that the oil derived or extracted from biomass can be upgraded with the removal of heteroatoms S, N, O, and P as well as metals or metalloids, saturation of double bonds and/or aromatics by addition of hydrogen. The authors are concerned with purifying raw bio oil containing high concentrations of S, N and O, and do not address the upgrading of BTX-rich streams separated from catalytic pyrolysis processes. Flowers et al in WO 2013089799 A1 describe a process for producing fuels from biomass by digestion in a solvent to form an intermediate liquor followed by upgrading processes that can include "hydrotreating to reduce the amount of or remove any remaining oxygen, sulfur, or nitrogen in the fuel blend." Flowers does not describe processes applied to BTX-rich mixtures derived from a catalytic pyrolysis process and does not describe processes that hydrogenate olefins and/or dienes in the same step. In Riley et al. US 2011/0230693 A1, a process is described for removing sulfur from aromatic streams, but no removal of nitrogen compounds or oxygenates or hydrogenation of olefins and dienes is described, and no application to a BTX-rich stream derived from CFP is described. In US 2011/0275869 A1, Prochazka et al. describe a process for upgrading a lignin containing biomass by pyrolysis with or without hydrogen, and the products dealkylated to produce an aromatics rich dealkylated stream, an aromatics rich non-dealkylated stream, and an aromatics-depleted stream that is further processes to produce syngas. The aromatics-depleted stream can optionally be treated to remove sulfur, but no heteroatom removal process such as hydrogenation is presented for the dealkylated or non-dealkylated aromatics streams, no olefin and/or diene hydrogenation is described, and no removal of nitrogen or oxygen impurities is included.

Thus a need remains for improved processes for recovering, separating, and purifying aromatic products produced from the product effluent of a catalytic pyrolysis process. The present invention provides recovery, separation, and purification processes that quench the hot effluent, separate the complex product mixture, remove sulfur and nitrogen containing impurities, hydrogenate olefins, dienes, and oxygenates, and recover valuable components.

SUMMARY OF THE INVENTION

It has surprisingly been found that a highly purified benzene, toluene, and xylenes (BTX) stream can be produced by the catalytic fast pyrolysis of biomass and separating and purifying the mixed BTX stream by hydrotreatment to remove sulfur, nitrogen, and oxygen containing compounds, and hydrogenating olefins and dienes. In one embodiment the invention comprises a method for producing aromatic chemicals from the product stream of a catalytic pyrolysis process, comprising: quenching the product stream (preferably with water); separating a first liquid phase and a first vapor phase, recovering aromatics from the first vapor phase; and hydrotreating at least a portion of the aromatics. In another embodiment the hydrotreated aromatic stream comprises sulfur-containing species of less than 50 ppmw (part per million by weight), or less than 10 ppmw, or less than 1 ppmw, or less than 25, or less than 10, or less than 1 ppmw of nitrogen containing organic species, or less than 100, less than 50, or less than 10, or less than 1 ppmw oxygenates, or less than 1,000, or less than 500, or less than 100, or less than 20 ppmw dienes, or has a Bromine Index of less than 100, or less than 50, or less than 25, or less than 15, or less than 10, or some combination of these. In some embodiments the first liquid phase is separated into an organic fraction and an aqueous fraction; all or a portion of the organic fraction is hydrotreated to form a purified organic phase. The concentration of phenol, cresols, or a combination of phenol and cresols can be reduced by at least 50% in the hydrotreating step. In some cases, the method is applied to a product stream wherein on a water-free and solids-free basis the product stream of a catalytic pyrolysis process comprises 20 to 60%, or 25 to 55% or 30 to 50%, or at least 20%, or at least 25%, or at least 30% CO calculated on a mass % basis. In some embodiments, less than 1 weight % of the aromatics in the feed stream are hydrogenated in the hydrotreating step. Preferably, a mixed BTX stream produced by the inventive method contains mercaptan sulfur species of less than 20, or less than 10, or less than 5, or less than 1 ppmw. In another embodiment the invention comprises a method for producing aromatic chemicals from the product stream of a catalytic pyrolysis process, comprising: quenching the product stream (preferably with water); separating a first liquid phase and a first vapor phase, recovering aromatics from the first vapor phase; condensing the first vapor phase to produce a second liquid phase and a second vapor phase from the first vapor phase. At least a portion of the aromatics can be hydrotreated in the second vapor phase. Another embodiment comprises a method for producing aromatic chemicals from the product stream of a catalytic pyrolysis process, comprising: quenching the product stream (preferably with water); separating a first liquid phase and a first vapor phase; condensing the first vapor phase and separating a second liquid phase and a second vapor phase; contacting the first vapor phase or second vapor phase or a combination of them with a contacting solvent to produce a third liquid phase and third vapor phase, recovering aromatics from the second liquid phase and the third liquid phase, and, optionally, hydrotreating at least a portion of the aromatics. In another embodiment, a portion of the second liquid phase, a portion of the third liquid phase, or a portion of the combination of the second and third liquid phases are hydrotreated; in another embodiment, the second and third liquid phases pass to a fractionation system and the liquid phases are fractionated into benzene-rich, toluene-rich, and xylenes-rich product streams. In some preferred embodiments, the hydrogen feed to the hydrotreater reactor passes once-through the reactor and is not recycled to the reactor inlet. In some preferred embodiments, the hydrogen feed to the hydrotreater reactor is separated from reaction effluent liquid and recycled back to the reactor. In some preferred embodiments, the hydrogen-rich effluent vapor from the reactor is processed in an amine scrubbing unit to remove by-product gases from hydrogenation reactions.

The invention also includes an organic liquid product stream or a mixed BTX stream produced by any of the inventive methods; for example, a mixed BTX stream comprising sulfur-containing species of less than 50 ppmw (part per million by weight), or less than 10 ppmw, or less than 1 ppmw; a mixed BTX stream comprising mercaptan sulfur species of less than 20, or less than 10, or less than 5, or less than 1 ppmw or a mixed BTX stream comprising less than 20, or less than 10, or less than 5, or less than 1 ppmw of thiophenic sulfur species; or a mixed BTX stream comprising less than 25, or less than 10, or less than 1 ppmw of nitrogen containing organic species; or a mixed BTX stream comprising less than 100, less than 50, or less than 10, or less than 1 ppmw oxygenates; or a mixed BTX stream comprising less than 1,000, or less than 500, or less than 100, or less than 20 ppmw dienes; or a mixed BTX stream having a Bromine Index of less than 100, or less than 50, or less than 25 or less than 10; or a mixed BTX stream comprising less than 1, or less than 0.1, or less than 0.01, or less than 0.001 weight percent of phenolic species; or a hydrotreated C9+ heavy aromatic stream produced by the inventive process comprising less than 15 ppmw sulfur, or less than 10 ppmw sulfur; preferably a C9+ heavy aromatic stream having a cetane number greater than 20. The invention also includes a product stream comprising C9+ aromatics produced by the inventive process that is then processed in a hydrocracker.

The invention also provides uses of the inventive products, for example using the product as a blendstock for diesel fuel; or as a gasoline blendstock; or as a jet fuel blendstock.

The invention includes methods, apparatus, and systems (which comprise apparatus plus process streams (that is, fluid compositions) and may further be characterized by conditions such as temperature or pressure). The invention also includes product mixtures made by the inventive methods. Thus, any of the descriptions herein apply to the inventive methods, apparatus, compositions, and systems.

Advantages of various aspects of the invention may include: increased yield, improved energy efficiency, isolation of especially desirable products and product mixtures, reduced pollution, and products that meet industry purity specifications.

Glossary

Aromatics—As used herein, the terms "aromatics" or "aromatic compound" are used to refer to a hydrocarbon compound or compounds comprising one or more aromatic groups such as, for example, single aromatic ring systems (e.g., benzyl, phenyl, etc.) and fused polycyclic aromatic ring systems (e.g. naphthyl, 1,2,3,4-tetrahydronaphthyl, etc.). Examples of aromatic compounds include, but are not limited to, benzene, toluene, indane, indene, 2-ethyl toluene, 3-ethyl toluene, 4-ethyl toluene, trimethyl benzene (e.g., 1,3,5-trimethyl benzene, 1,2,4-trimethyl benzene, 1,2,3-trimethyl benzene, etc.), ethylbenzene, styrene, cumene, methylbenzene, propylbenzene, xylenes (e.g., p-xylene, m-xylene, o-xylene), naphthalene, methyl-naphthalene (e.g., 1-methyl naphthalene), anthracene, 9.10-dimethylanthracene, pyrene, phenanthrene, dimethyl-naphthalene (e.g., 1,5-dimethylnaphthalene, 1,6-dimethylnaphthalene, 2,5-dimethylnaphthalene, etc.), ethyl-naphthalene, hydrindene, methyl-hydrindene, and dimethyl-hydrindene. Single-ring and/or higher ring aromatics may also be produced in some embodiments. Aromatics also include single and multiple ring compounds that contain heteroatom substituents, i.e. phenol, cresol, benzofuran, aniline, indole, thiophene, etc.

Biomass—As used herein, the term "biomass" is given its conventional meaning in the art and is used to refer to any organic source of energy or chemicals that is renewable. Its major components can be: (1) trees (wood) and all other vegetation; (2) agricultural products and wastes (corn, fruit, garbage ensilage, etc.); (3) algae and other marine plants; (4) metabolic wastes (manure, sewage), and (5) cellulosic urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098.

Biomass is conventionally defined as the living and recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burnt as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, and black liquor from wood pulp or algae. Biomass excludes organic material which has been transformed by geological processes into substances such as coal, oil shale or petroleum. Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. Processing of the raw material for introduction to the processing unit may vary according to the needs of the unit and the form of the biomass.

Bromine Index—The Bromine Index is the amount of bromine in milligrams absorbed by 100 grams of sample.

Bromine Number—The Bromine Number is the amount of bromine in grams absorbed by 100 grams of sample.

Catalysts—Catalyst components useful in the context of this invention can be selected from any catalyst known in the art, or as would be understood by those skilled in the art. Catalysts promote and/or effect reactions. Thus, as used herein, catalysts lower the activation energy (increase the rate) of a chemical process, and/or improve the distribution of products or intermediates in a chemical reaction (for example, a shape selective catalyst). Examples of reactions that can be catalyzed include: dehydration, dehydrogenation, isomerization, hydrogen transfer, aromatization, decarbonylation, decarboxylation, aldol condensation, molecular cracking and decomposition, and combinations thereof. Catalyst components can be considered acidic, neutral or basic, as would be understood by those skilled in the art.

For catalytic fast pyrolysis, particularly advantageous catalysts include those containing internal porosity selected according to pore size (e.g., mesoporous and pore sizes typically associated with zeolites), e.g., average pore sizes of less than about 100 Angstroms (Å), less than about 50 Å, less than about 20 Å, less than about 10 Å, less than about 5 Å, or smaller. In some embodiments, catalysts with average pore sizes of from about 5 Å to about 100 Å may be used. In some embodiments, catalysts with average pore sizes of between about 5.5 Å and about 6.5 Å, or between about 5.9 Å and about 6.3 Å may be used. In some cases, catalysts with average pore sizes of between about 7 Angstroms and about 8 Å, or between about 7.2 Å and about 7.8 Å may be used.

In some preferred embodiments of CFP, the catalyst may be selected from naturally occurring zeolites, synthetic zeolites and combinations thereof. In certain embodiments, the catalyst may be a ZSM-5 zeolite catalyst, as would be understood by those skilled in the art. Optionally, such a catalyst can comprise acidic sites. Other types of zeolite catalysts include: ferrierite, zeolite Y, zeolite beta, mordenite, MCM-22, ZSM-23, ZSM-57, SUZ-4, EU-1, ZSM-11, (S)AlPO-31, SSZ-23, among others. In other embodiments, non-zeolite catalysts may be used; for example, WOx/ZrO2, aluminum phosphates, etc. In some embodiments, the catalyst may comprise a metal and/or a metal oxide. Suitable metals and/or oxides include, for example, nickel, palladium, platinum, titanium, vanadium, chromium, manganese, iron, cobalt, zinc, copper, gallium, and/or any of their oxides, among others. In some cases promoter elements chosen from among the rare earth elements, i.e., elements 57-71, cerium, zirconium or their oxides for combinations of these may be included to modify activity or structure of the catalyst. In addition, in some cases, properties of the catalysts (e.g., pore structure, type and/or number of acid sites, etc.) may be chosen to selectively produce a desired product.

Suitable hydrotreating catalysts for use in the hydrotreater are known conventional hydrotreating catalysts and include those which are comprised of at least one Group VIII metal (preferably iron, cobalt and nickel, more preferably cobalt and/or nickel) and at least one Group VI metal (preferably molybdenum and tungsten) on a high surface area support material, preferably alumina or silica or a mixture of alumina and silica. Other suitable hydrotreating catalysts include zeolitic catalysts, as well as noble metal catalysts where the noble metal is selected from rhodium, ruthenium, iridium, palladium, and platinum. It is within the scope of the processes herein that more than one type of hydrotreating catalyst be used in the same reaction vessel. The Group VIII metal is typically present in an amount ranging from about 0.5 to about 20 weight percent, preferably from about 0.5 to about 10 weight percent. The Group VI metal will typically be present in an amount ranging from about 1 to about 25 weight percent, and preferably from about 1 to about 12 weight percent. While the above describes some exemplary catalysts for hydrotreating, other hydrotreating and/or hydrodesulfurization catalysts may also be used depending on the particular feedstock and the desired effluent quality.

Olefins—As used herein, the terms "olefin" or "olefin compound" (a.k.a. "alkenes") are given their ordinary meaning in the art, and are used to refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed-ring) or of an open-chain grouping, respectively. In addition, olefins may include any suitable number of double bonds (e.g., monoolefins, diolefins, triolefins, etc.). Olefins with two double bonds are often referred to as dienes. Examples of olefin compounds include, but are not limited to, ethene, propene, allene (propadiene), 1-butene, 2-butene, isobutene (2 methyl propene), butadiene, and isoprene, among others. Examples of cyclic olefins include cyclopentene, cyclohexene, cycloheptene, among others. Aromatic compounds such as toluene are not considered olefins; however, olefins that include aromatic moieties are considered olefins, for example, benzyl acrylate or styrene.

Oxygenates—Oxygenates include any organic compound that contains at least one atom of oxygen in its structure such as alcohols (methanol, ethanol, etc.), acids (e.g. acetic acid, propionic acid, etc.), aldehydes (e.g. formaldehyde, acetaldehyde, etc), esters (e.g. methyl acetate, ethyl acetate, etc.), ethers (e.g. dimethyl ether, diethyl ether, etc.), aromatics with oxygen containing substituents (e.g. phenol, cresol, benzoic acid etc.), cyclic ethers, acids, aldehydes, and esters (e.g. furan, furfural, etc.), and the like.

Pyrolysis—As used herein, the terms "pyrolysis" and "pyrolyzing" are given their conventional meaning in the art and are used to refer to the transformation of a compound, e.g., a solid hydrocarbonaceous material, into one or more other substances, e.g., volatile organic compounds, gases and coke, by heat, preferably without the addition of, or in the absence of, $O_2$. Preferably, the volume fraction of $O_2$ present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Example of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098.

Recovery—The recovery of a component is the fraction (or percent) of that component that is present in the recovered product stream(s) compared to the amount of that component that is present in the reactor effluent stream. For example if 10 grams of product A is present in the raw effluent and 8.5 grams of product A is present in the recovered product stream(s), then the recovery of A is 8.5/10 or 0.85 (85%).

CFP Reaction Technology—Examples of apparatus and process conditions suitable for CFP are described in U.S. Pat. No. 8,277,643 of Huber et al. and in the US Patent Application 2013/0060070A1 of Huber et al. that are incorporated herein by reference. Conditions for CFP of biomass may include one or any combination of the following features (which are not intended to limit the broader aspects of the invention): a zeolite catalyst, a ZSM-5 catalyst; a zeolite catalyst comprising one or more of the following metals: titanium, vanadium, chromium, manganese, iron, cobalt, nickel, copper, zinc, gallium, platinum, palladium, silver, phosphorus, sodium, potassium, magnesium, calcium, tungsten, zirconium, cerium, lanthanum, and combinations thereof; a fluidized bed, circulating bed, or riser reactor; an operating temperature in the range of 300° to 1000° C.; and/or a solid catalyst-to-biomass mass ratio of between 0.1 and 40.

BRIEF DESCRIPTION OF THE DRAWINGS

FIG. 4 shows Table 4: stream concentrations in weight% and properties for FIG. 2.

FIG. 5 shows Table 5: stream concentrations in weight% and properties for FIG. 3.

DETAILED DESCRIPTION OF THE INVENTION

Figure 1:
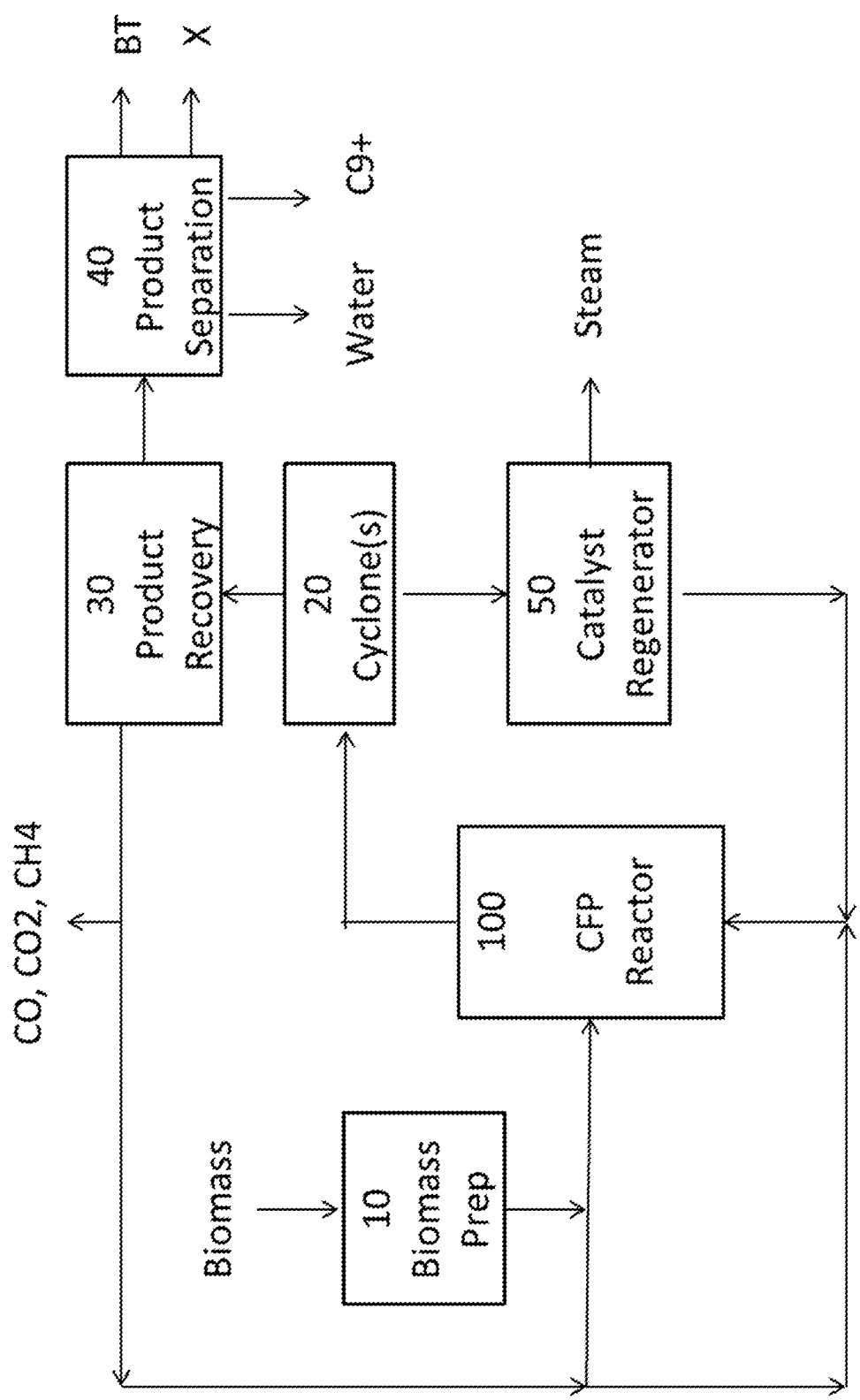
FIG. 1 illustrates a process for converting biomass into aromatics.

FIG. 1 shows an exemplary process for converting biomass to aromatics (BTX) and other components (C9+). Biomass is introduced and prepared in stage 10 by chipping, drying, grinding, or other processes, or some combination of these. The prepared biomass is introduced along with a recycle gas or transport fluid into the CFP reactor. The CFP reactor is a fluidized bed catalytic reactor that is fluidized by a portion of recycle gas or other fluid. The products from the CFP reactor are separated from some of the catalyst, minerals, or char that is carried along with the fluid stream in one or more cyclones. The catalyst from the cyclones and other catalyst removed from the reactor is regenerated in a catalyst regeneration system 50 in which the coke and char are combusted and returned to the reactor, or simply returned to the reactor. The raw fluid product is sent to a product recovery system 30 where the liquid products benzene, toluene, xylenes, naphthalenes, oxygenates, and other useful products are quenched to reduce temperature, recovered, and separated from the non-condensable gases, i.e., CO, $CO_2$, $CH_4$, $H_2$, and light olefins and paraffins, and the water, char, coke, ash, and catalyst fines. A portion of the gases is purged, and a portion is optionally recycled for use in the CFP reactor. The crude mixture of BTX and other products is separated into various fractions in separation step 40 producing a water stream that can be recycled or sent to a water treatment system or otherwise utilized, a heavy fraction that contains C9+, oxygenates, and other materials, and various fractions of benzene, toluene, and xylenes. A portion of the crude BTX stream that has been separated from the C9+ aromatics can be purified by hydrotreatment to remove S, N, and O containing compounds and saturate olefins and dienes. The crude C9+ fraction can similarly be purified by hydrotreatment to remove S, N, and O containing compounds and saturate olefins and dienes.

Figure 2:
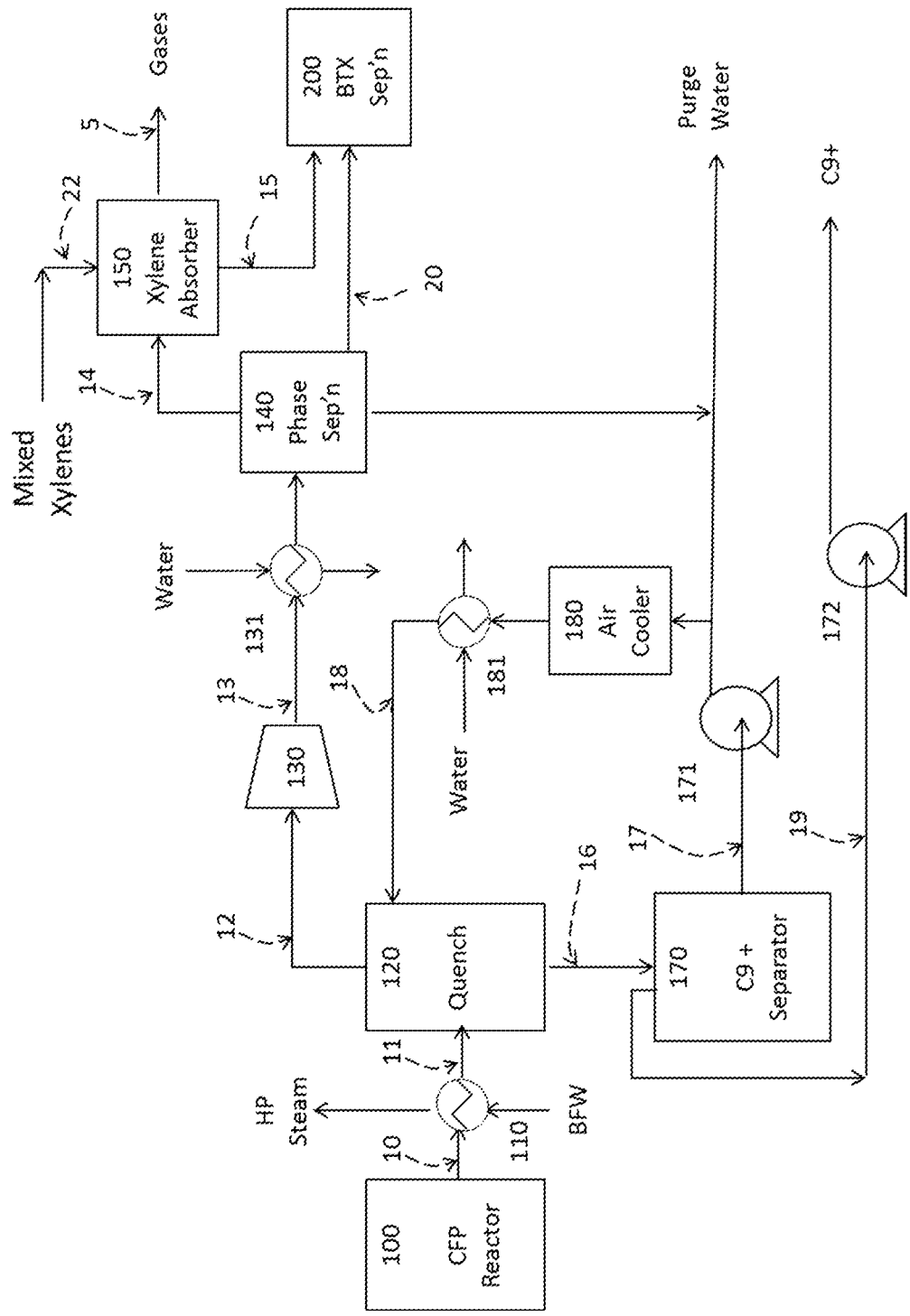
FIG. 2 presents a schematic of a recovery and quench system for BTX recovery from CFP of biomass.

FIG. 2 presents a schematic of a quench and recovery system for producing benzene, toluene, xylenes, oxygenates, and C9+ products from a biomass CFP process. In FIG. 2 the CFP reactor 100 produces a product stream at a high temperature that is cooled in heat exchanger 110 and sent to a quench system 120 to reduce temperature. Prior to the heat exchanger 110, the raw product effluent is passed through at least one cyclone (see FIG. 1, 20) that removes much of the solids in the mixture. In one option a venturi scrubber is placed upstream of the quench system to remove additional particulates including char, coke, catalyst, and ash. The quench system 120 contacts a stream of water with the gaseous product stream. This quenching water may comprise reaction product water made by pyrolysis and catalytic conversion of biomass. The product streams from the quench system 120 include: a condensed water stream that comprises water and organics comprising C9+ aromatics, oxygenates, and other compounds, and solids, and a gas/vapor product stream that comprises benzene, toluene, xylenes, CO, CO2, CH4, N2, H2, C2-C4 olefins and paraffins, and other compounds. The gas/vapor product stream from quench system 120 is passed to a compressor 130 and a heat exchanger 131. Heat exchanger 131 cools the stream and condenses recoverable hydrocarbon products. This cooling and condensing can optionally be performed by air cooled, water cooled, or chilled water cooled exchangers, or some combination of these. The compressed and cooled product stream is passed to a 3-phase separator 140. The gaseous stream from 140 (Stream 14) is sent to absorber 150 in which the gases are scrubbed with a mixed-xylenes containing absorption liquid stream obtained from the BTX separation or other liquid stream recovered from the process, to recover BTX from the gases. The liquid product from 150 (Stream 15) is optionally combined with the liquid phase from 140 (Stream 20) and the combined product stream may be sent to a BTX separation unit 200 described in more detail in FIG. 3. Alternatively, liquid streams from 140 and 150 may be separately sent to the distillation unit 210 in FIG. 3. The gas stream from absorber 150 that comprises the lighter components and fixed gases (CO, CO2, H2, CH4, N2, C2-C4 olefins and alkanes, etc.) is in part sent back to the reactor to fluidize the catalyst and provide a source of reactive olefins which can react in the presence of biomass to produce additional aromatic product. Any gas in excess of reactor fluidizing and olefin reaction requirements can be used for other processing needs, combusted, or purged. The aqueous stream from phase separator 140 is sent to the water purge stream. The water and high boiling point components from quench system 120 are sent to an aqueous/organics separator 170. The organics phase from 170 that comprises C9+ aromatics (Stream 19) is pumped by pump 172 and sent to storage or a portion may be used in the process. The water phase (Stream 17) from 170 is pumped in pump 171 and a portion of the stream is passed through optional air cooler 180, heat exchanger 181, and recycled to the quench system. Filters (not shown) can be placed after separator 170 or at other locations in the flow scheme to remove particulates, char, and catalyst fines from the organic and water streams. The remainder of the water is purged from the system and sent to water treatment.

Venturi scrubbers are known in the art, and typically a venturi scrubber consists of three sections: a converging section, a throat section, and a diverging section. The inlet gas stream enters the converging section and, as the area decreases, gas velocity increases. Liquid is introduced either at the throat or at the entrance to the converging section. The inlet gas, forced to move at extremely high velocities in the small throat section, shears the liquid from its walls, producing an enormous number of very tiny droplets. Particle and gas removal occur in the throat section as the inlet gas stream mixes with the fog of tiny liquid droplets. The inlet stream then exits through the diverging section, where it is forced to slow down. The liquid and particulates are collected below the venturi and the vapors exit to the side. As one non-limiting example, venturi systems are described in U.S. Pat. No. 5,279,646, which is incorporated herein by reference.

Table 1 shows a typical distribution of the olefin, diene, sulfur, nitrogen, and oxygen components in various process streams. The content and amounts of species that must be removed in order to meet commercial specifications for benzene, toluene, xylenes, a mixed stream of BTX, or a heavy aromatics stream (C9+) are unlike the mixture of impurities that are removed by hydrotreating in conventional processes.

TABLE 1

Typical component concentrations (ppmw) in process streams in the CFP process (See FIG. 2).

| Component | C5+ fraction of raw product | Mixed BTX (Stream 20) | C9+ Product (Stream 19) |
| --- | --- | --- | --- |
| C5-C7 olefins | 3,746 | 6,883 | 85 |
| C5-C9 dienes | 2,201 | 2,550 | 0 |

TABLE 1-continued

Typical component concentrations (ppmw) in process streams in the CFP process (See FIG. 2).

| Component | C5+ fraction of raw product | Mixed BTX (Stream 20) | C9+ Product (Stream 19) |
|---|---|---|---|
| Sulfur (as S) | 85 | 95 | 19 |
| Oxygen (as O) | 1,473 | 202 | 9,499 |
| Nitrogen (as N) | 82 | 27 | 428 |

Table 2 presents the identities of sulfur contaminant species identified in the product stream from a CFP process. As biomass contains relatively modest concentrations of sulfur species and most biomass upgrading processes are aimed at fuels production, processes for removing these species have not been developed. The mixture contains species that potentially cannot be separated from the desired products such as benzene, toluene, xylenes, or fuel oil by distillation. Thus a process for their removal is necessary to product acceptable quality commercial chemicals.

TABLE 2

Typical sulfur species concentrations (ppmw) in BTX-rich liquid product from CFP (stream 20).

| Sulfur compound | Concentration, ppmw | Boiling Point, C. | Product stream potentially contaminated |
|---|---|---|---|
| COS | 0.3 | −50 | Fuel gas |
| Dimethyl sulfide | 1.9 | 37 | Fuel gas |
| Thiophene | 51.5 | 84 | Benzene |
| Dimethyl disulfide | 0.7 | 110 | Toluene |
| 2-methyl thiophene | 30.0 | 113 | Toluene |
| 3-methyl thiophene | 27.6 | 115 | Toluene |
| 2-ethyl thiophene | 5.8 | 133 | Xylenes |
| Thiophenol | 4.4 | 169 | Fuel oil (C9+) |
| n-butyl sulfide | 0.5 | 188 | Fuel oil (C9+) |
| Methyl benzothiophene | 3.5 | 242 | Fuel oil (C9+) |

In Table 3 a comparison is made among the BTX streams typically produced in CFP, naphtha reforming, and cracking (pygas). The compositions are strikingly different, as the crude CFP mixture contains a larger fraction of toluene than either naphtha reformate and pygas. The crude CFP product also has much higher benzene content than naphtha reformate, and much higher xylenes content than pygas. The crude CFP product contains less C8 (ethyl benzene plus styrene), less C9+ aromatics, and less non-aromatic compounds than either naphtha reformate or pygas. The mixture of contaminants that must be removed to meet commercial chemical specifications is quite different for the crude BTX from a CFP process, which presents different challenges in hydrotreating the stream. Whereas a naphtha reformate stream contains predominately olefins and dienes as the contaminant that is removed by adsorption on clay treaters or by selective hydrogenation, the CFP product contains olefins and dienes but additionally sulfur, nitrogen, and oxygen hydrocarbon species that need to be removed. Whereas the pygas contains significant quantities of sulfur and nitrogen compounds and very high diene levels compared to crude BTX from CFP, the CFP process stream contains oxygenate species that are essentially absent from pygas. Thus the purification problem for a crude BTX stream from a CFP process is a different and more complex problem than it is for either naphtha reformate or pygas.

TABLE 3

Comparison of major species and impurity species in BTX stream produced in a CFP process (stream 20) with BTX streams from conventional processes.

| | Source of BTX | | |
|---|---|---|---|
| Component | CFP | Naphtha reformate | Pygas |
| Benzene, wt % | 32 | 3 | 30-50 |
| Toluene, wt % | 47 | 13 | 15-20 |
| Xylenes, wt % | 16 | 18 | 4-8 |
| Ethyl Benzene, wt % | <1 | 5 | 2-3 |
| Styrene, wt % | <1 | 0 | 3-10 |
| Heavy Aromatics, C9+, wt % | <1 | 16 | 3-13 |
| Non-Aromatics, wt % | 1-2 | 45 | 10-20 |
| Olefins, wt % | <1 | <1 | 3-6 |
| Organo-sulfur species, ppmw | 10-100 | <1 | 300-900 |
| Mercaptan sulfur, ppmw | <2 | <1 | 50 |
| Organo-nitrogenates, ppmw | 50-500 | <1 | 5 |
| Organo-oxygenates, ppmw | 200-4,000 | <1 | Not assessed |
| Dienes, ppmw | 1,000-3,000 | <5,000 | >30,000 |
| Bromine number | 4-12 | <1 | 20-70 |

Figure 3:
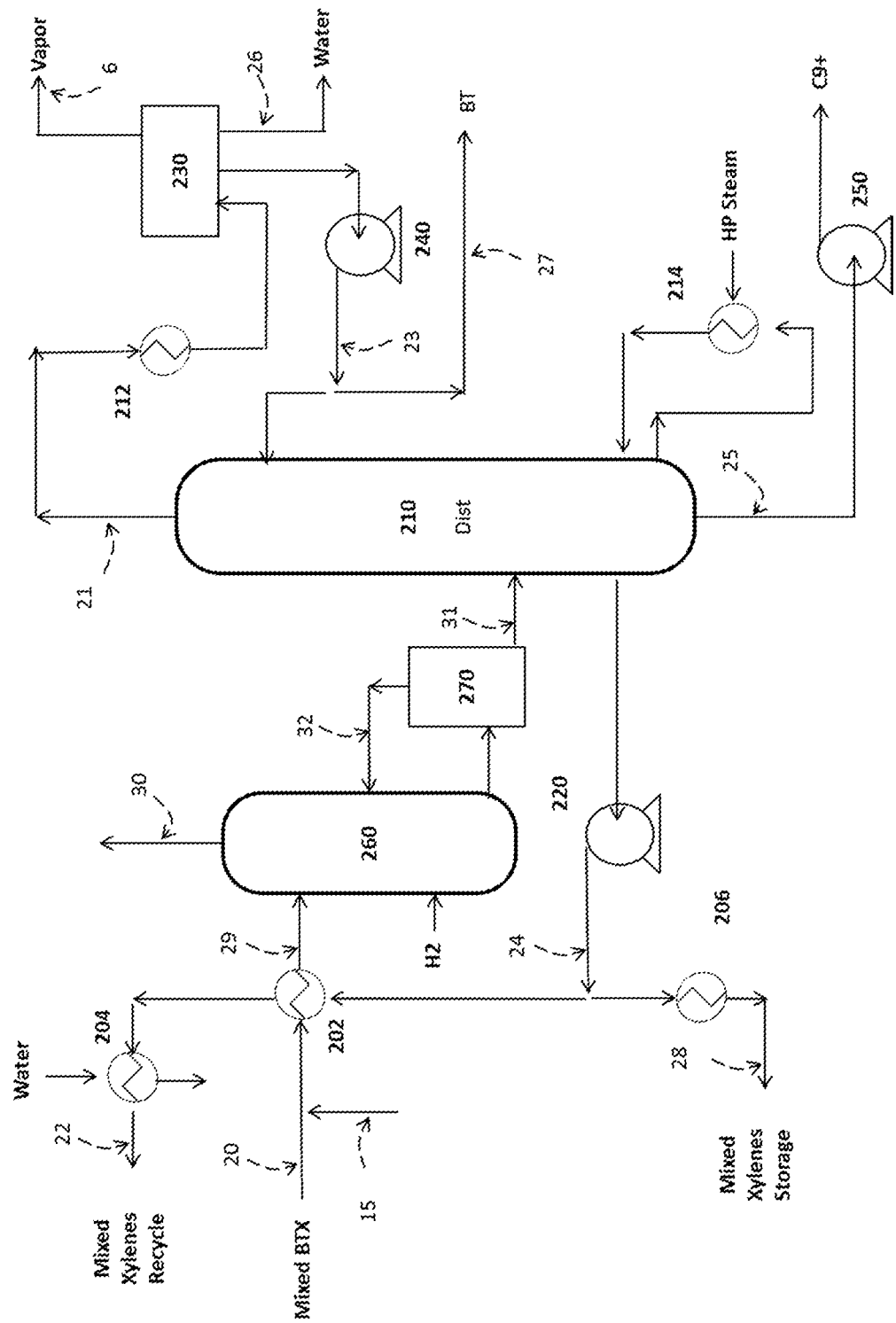
FIG. 3 presents a schematic of a BTX separation and purification process

FIG. 3 summarizes the preliminary purification and separation scheme for purifying and separating benzene and toluene (BT) from xylenes (X). The mixed BTX stream (Stream 20) from the recovery system in FIG. 2 is combined with the liquid stream from the absorber 150 in FIG. 2, optionally compressed to elevated pressure, heated with hot mixed-xylenes product in heat exchanger 202, or otherwise heated, to form Stream 29, and then fed to hydrotreater 260. A stream of hydrogen containing gas is also fed to hydrotreater 260. Sulfur and nitrogen compounds are hydrogenated to produce H2S, COS, and NH3, some of which exit the hydrotreater as stream 30. Oxygenates may be hydrogenated in hydrotreater 260 to form water. Olefins and dienes in stream 29 are hydrogenated in hydrotreater 260 as well. In one embodiment the hydrotreatment is carried out in two stages. Liquid product from hydrotreater 260 is fed to vapor-liquid separator 270. Gas stream 32 from vapor-liquid separator can be sent to other processes, or optionally scrubbed in an amine scrubber (not shown) to remove H2S, NH3 and other compounds and then compressed (not shown) and recycled to hydrotreater 260. Liquid product stream 31 from vapor-liquid separator 260 is optionally cooled by heat exchange or other method, the pressure is adjusted, and then the cooled, depressurized stream is fed to distillation column 210.

Distillation column 210 is heated by reboiling a take-off stream with high pressure steam although other methods such as reboiling with a natural gas fired furnace are envisioned as being within the scope of this invention. A light fraction of product that comprises a BT mixture is passed to condenser 212 and the condensed liquids are collected in collector 230. This lighter fraction can optionally be air cooled, water cooled, or chilled water cooled, or some combination of these. A fraction of the condensed liquids are returned to the distillation column 210 via pump 240 and the remainder of the BT stream is sent to storage for further purification. The overhead vapors from the BT condensation are combusted in a CO furnace boiler to generate steam, or optionally sent to a gas turbine to generate electricity in a combined cycle scheme, or sent to a thermal oxidizer or flare, or can be employed in the CFP process, or used elsewhere. The condensed aqueous phase that collects in collector 230 is sent to water treatment. A portion of the xylenes rich fraction is pumped via pump 220 from distillation column 210 to heat the incoming crude BTX mixture, cooled in heat exchanger 204 and sent to the absorber 150 in FIG. 2. The remainder of the xylenes rich fraction is sent to storage and further purification. The bottom ends from distillation column 210 (stream 25) are heat exchanged to raise steam (not shown), optionally cooled, and pumped via pump 250 to storage or further upgraded. Streams 19 from FIG. 2 and 25 from FIG. 3 are optionally combined and optionally sent to a second hydrotreater, or each can be hydrotreated individually.

Absorber 150 in FIG. 2 may be a conventional absorber system known to those skilled in the art. The absorber can be a packed bed absorber. A preferred absorber solvent is a mixed-xylenes stream. When a mixed-xylenes stream is used as the absorber fluid the absorber is operated at a relatively low operating temperature of from −20 to 50 C, or from −5 to 30 C, or most preferably from 5 C to 10 C. The absorber is operated at elevated pressure from 100 kPa to 2000 kPa, or from 200 kPa to 2000 kPa, or most preferably from 500 kPa to 1500 kPa. The feed ratio of liquid mixed xylenes to vapors for absorber 150 can range from 0.001 to 2, or from 0.002 to 1, or from 0.005 to 0.5, or more preferably from 0.01 to 0.1, or less than 0.1, or less than 0.05, or less than 0.02 on a molar basis, i.e. moles of mixed xylenes divided by moles of vapor. Distillation column 210 may be a conventional distillation column as is known to those skilled in the art, which contains at least 5 or at least 10 or at least 20 or at least 30, or at least 50 theoretical plates or stages of distillation. In some embodiments distillation column 210 may be placed before the hydrotreater 260.

Hydrotreater 260 in FIG. 3 can be any reactor design that effectively brings together the raw BTX liquid with hydrogen at a temperature and for a time sufficient that molecular interactions effective to increase the hydrocarbon saturation, reduce concentration of the sulfur containing compounds, and reduce the concentration of the nitrogen compounds of the feed stream can occur. Hydrogenation can occur in the gas phase, or in a multi-phase trickle bed reactor. The reaction conditions employed for processing will depend in part on the particular reactor design selected and concentrations of the individual species, but reaction temperatures of about 20° C. to about 350° C. and gas pressures of about 5 bar to about 100 bar are normally preferred. Advantageously, this contacting step may be carried out at a liquid hourly space velocity greater than 0.1 hr-1.

The volumetric ratio of gas to liquid (the "G:L ratio") in the hydrotreater at reactor operating conditions can range from about 0.1 to 20:1, more typically 0.1 to about 10:1. The processes of the present invention can be carried out with systems having one or more hydrotreater reactor vessels. In some embodiments, systems include two or more reactor vessels that are connected in series such that effluent from upstream vessels comprises feed for downstream vessels. Reactor vessels can contain one or more catalyst beds containing catalyst. In some embodiments, the reactor vessel can contain two or more catalyst beds and or the reactor systems may include two or more reactor vessels. Generally, each reactor vessel will comprise one or more inlets, such as for mixed BTX feed or effluent from upstream reactor vessels and for the hydrogen-containing treatment gas. The vessels will further comprise one or more outlets, such as for BTX product (effluent) and/or exhausted treatment gases. Optionally gas injection ports may be spaced along the reactor length to control temperature and improve mixing. Optionally, liquid redistribution fixtures can be placed between stages of the hydrotreater to improve liquid distribution and gas-liquid mixing.

Hydrotreater catalyst beds can be operated according to any suitable mode including up-flow, down-flow, or horizontal flow configurations. Additionally, catalyst beds can be operated using co-current or counter-current gas/liquid flow. In co-current flow, the gas and liquid travel in the same direction, whereas in counter-current flow, the gas and liquid travel in opposite directions. Any combination of catalyst bed configuration and flow regime is suitable, including, for example, systems having multiple reactors independently operating under different configurations and flow regimes.

In some embodiments of the present invention, the processes include the ability to recycle the unreacted portion of the hydrogen-containing treatment gas back to the hydrotreatment reactors so that unreacted hydrogen can be utilized efficiently in the hydrotreating process. Accordingly, in some embodiments, reactors have inlet and outlet valves that allow the gas to be recycled. In other embodiments, recycle gas is added to the hydrogen-containing treatment gas prior to injection into the reactor vessels. Typically the recycle stream is scrubbed to remove NH3, H2S, COS, and other undesirable components before being readmitted to the reactor.

Suitable hydrotreating catalysts for use in the hydrotreater are any known conventional hydrotreating catalysts and include those which are comprised of at least one Group VIII metal (preferably iron, cobalt and nickel, more preferably cobalt and/or nickel) and at least one Group VI metal (preferably molybdenum and tungsten) on a high surface area support material, preferably alumina or silica or a mixture of alumina and silica. Other suitable hydrotreating catalysts include zeolitic catalysts, as well as noble metal catalysts where the noble metal is selected from rhodium, ruthenium, iridium, palladium, and platinum. It is within the scope of the processes herein that more than one type of hydrotreating catalyst be used in the same reaction vessel. The Group VIII metal is typically present in an amount ranging from about 0.5 to about 20 weight percent, preferably from about 0.5 to about 10 weight percent. The Group VI metal will typically be present in an amount ranging from about 1 to about 25 weight percent, and preferably from about 1 to about 12 weight percent. While the above describes some exemplary catalysts for hydrotreating, other hydrotreating and/or hydrodesulfurization catalysts may also be used depending on the particular feedstock and the desired effluent quality. Catalysts and hydrotreating conditions can be selected to achieve less than 5%, or less than 2%, or less than 1% hydrogenation of the aromatic carbon-carbon bonds in the aromatics in the feed to the hydrotreater. The quench system described herein has a variety of advantages in recovering products from a CFP process. The quench cools the product vapors and condenses reaction product water along with heavy aromatics, and oxygenates. The whole product inlet temp to the quench system can range from 200 to 620 C, or from 400 to 550 C, or preferably from 425 to 500 C. The ratio of water to gas feed can range from 0.1:1 to 100:1 by weight, or from 0.5:1 to 20:1 by weight or from 1:1 to 10:1 by weight, or from 2:1 to 5:1 by weight. Quenching with water removes the great majority of the heavy C9+ hydrocarbons, oxygenates such as phenol and cresol, allowing further downstream vapor processing by cooling which is not otherwise possible due to the high melting point of some components of the C9+ material, e.g., naphthalene, m.p. 80° C. In some embodiments of this invention the temperature of the overhead vapor stream 12 from the quench system 120 in FIG. 2 is from 10° C. to 200° C., or from 20° C. to 150° C., or from 30° C. to 100° C., or from 40° C. to 80° C., or from 50° C. to 70° C. The overhead pressure of the vapor stream from the quench system can range from 100 kPa to 2000 kPa, or from 150 kPa to 1500 kPa, or from 200 kPa to 1000 kPa, or from 300 kPa to 700 kPa. The overhead vapor from the quench contains most of the aromatics. This vapor can then be processed further to recover BTX and other aromatic compounds.

The quench may also function as a water wash that removes particulate material such as char, coke, ash, and catalyst fines that carry over from the reactor cyclones. These particles may collect in the liquid phase and can be removed from the system by filtration or other downstream process steps known to those skilled in the art. The collected solids can optionally be returned to the catalyst regeneration step or can be collected for separation and recovery of valuable components. Removal of fine particulates in the water quench system protects other downstream equipment from damage, particularly the recycle compressor. Another advantage is that the water needed for the quench can be generated in the process when it is operating at steady state rendering the process independent of water sources other than water needed for startup.

A preferred embodiment of the present invention employs a mixed-xylenes stream in the product recovery. Another preferred embodiment uses an absorbent fluid (solvent) that is a stream already present in the process such as xylenes, naphthalenes, C9+ mixtures, or some combination of these, thus requiring no new solvent to be introduced to the process. In another embodiment the compressed and cooled stream exiting heat exchanger 131 enters absorber 150 directly without the use of a separate 3-phase separator 140. In this case absorber 150 functions to separate the 3 phases as well as absorb aromatic compounds from the vapor into the organic liquid phase. A stream from the BTX column such as the mixed-xylene side-stream cut can serve the purpose of generating the solvent, or it can be recovered from the C9+/water separator, and therefore there is no need for a solvent extraction/recovery system. Use of a stream that is already present in the process and recovery scheme provides significant economic advantages and renders the process independent of solvent supply other than at start-up.

Optionally, a solvent other than the xylenes stream shown in FIGS. 2 and 3 can be used to recover the BTX products from the quenched product vapors. Other potential solvents include mixtures of hydrocarbon compounds such as stream 19, 22, or 25, or fractions thereof, any solvent derived from the process that has a higher boiling point than benzene and toluene and dissolves the aromatics, or heavy hydrocarbon streams used in conventional unsaturates gas plants. Gas plant solvents include hydrocarbons boiling in the distillate range, and may include bio-diesel streams.

The CFP process may be conducted at a temperature of 400° C. or more, and the product stream from 100 in FIG. 1 is typically at a temperature of 300-650° C., or 400-575° C., or 500-550° C., and a pressure of 100 kPa to 1500 kPa, or 200 kPa to 1000 kPa, or 300 kPa to 700 kPa, or at least 200 kPa, or at least 300 kPa or at least 400 kPa. (Pressures are expressed as absolute pressures.) The raw product stream from 100 comprises aromatics, olefins, oxygenates, paraffins, $H_2$, $CH_4$, CO, $CO_2$, water, char, ash, coke, catalyst fines, and a host of other compounds. On a water-free and solids-free basis the raw product stream can comprise 20 to 60%, or 25 to 55% or 30 to 50%, or at least 20%, or at least 25%, or at least 30% CO calculated on a mass % basis. On a water-free and solids-free basis the raw product stream can comprise 10 to 50%, or 15 to 40%, or 20 to 35%, or at least 5%, or at least 10%, or at least 15%, or at least 20% $CO_2$ calculated on a mass % basis. On a water-free and solids-free basis the raw product stream can comprise 0.1 to 2.0, or 0.2 to 1.5, or 0.3 to 0.75%, or at least 0.1%, or at least 0.2%, or at least 0.3%, or less than 10%, or less than 5%, or less than 1% H2 calculated on a mass % basis. On a water-free and solids-free basis the raw product stream can comprise 2 to 15, or 3 to 10, or 4 to 8%, or less than 15%, or less than 10%, or less than 8% $CH_4$ calculated on a mass % basis. On a water-free and solids-free basis the raw product stream can comprise 2 to 40, or 3 to 35 or 4 to 30%, or less than 40%, or less than 35%, or less than 30%, or less than 20% BTX calculated on a mass % basis. On a water-free and solids-free basis the raw product stream can comprise 0.1 to 10%, or 0.2 to 5%, or 0.3 to 3%, or less than 5%, or less than 3%, or less than 2% oxygenates calculated on a mass % basis. On a water-free and solids-free basis the raw product stream can comprise 1 to 15%, or 2 to 10%, or 3 to 6% C2-C4, or at least 1%, or at least 2%, or at least 3% olefins calculated on a mass % basis. On a water-free and solids-free basis the raw product stream can comprise a vapor mixture where the sum of CO and CO2 is from 30 to 90, or from 40 to 85, or from 50 to 80%, calculated on a mass % basis.

The quench water enters the quench system 120 at a temperature from −5 to 100° C., or 20 to 60° C., or 30 to 55° C., or 35 to 50° C. Heat exchanger 110 typically cools the raw product stream to a temperature of 250 to 600° C., or 350 to 550° C., or 400 to 500° C. The quenched, compressed, cooled product stream from heat exchanger 131 in FIG. 1 can be separated in phase separator 140 held at a temperature of −30 to 60° C., or −15 to 40° C., or −5 to 30° C., or 0 to 10° C., and pressure from 100 to 8000 kPa, or to from 500 to 4000 kPa, or from 600 to 2000 kPa. The organic vapor phase from separator 140 is contacted with a xylenes (or other solvent) stream in absorber 150 at a temperature −30 to 60° C., or −15 to 40° C., or −5 to 30° C., or 0 to 10° C., and pressure from 100 and 7000 kPa, or to from 300 to 4000 kPa, or from 400 to 1000 kPa.

The crude BTX stream is heated by heat exchange against a mixed xylenes stream in 202 in FIG. 3 where the BTX stream enters at a temperature from −10 to 150° C., or 0 to 50° C., or 2 to 20° C. and the mixed xylenes stream enters at a temperature from 50 to 300° C., or 100 to 225° C., or 150 to 200° C. to be passed to the distillation step 210.

The crude BTX stream 29 in FIG. 3 can comprise from 5 to 85%, or from 10 to 70%, or from 20 to 55%, or from 25 to 40% benzene, from 10 to 95%, or from 20 to 80%, or from 30 to 65%, or from 35 to 55% toluene, from 2 to 40%, or from 5 to 30%, or from 10 to 25% xylenes, with ethyl benzene, styrene, and other aromatics each less than 5%, or less than 3%, or less than 1%, and non-aromatic compounds less than 10%, or less than 5%, or less than 3% by weight. The crude BTX stream 29 may comprise sulfur-containing species of at least 1 ppmw (part per million by weight), or at least 10 ppmw, or at least 50 ppmw. The crude BTX stream 29 may comprise mercaptan sulfur species of less than 20, or less than 10, or less than 5, or less than 2 ppmw. The crude BTX stream 29 may comprise thiophene sulfur species (thiophene and substituted thiophenes) of at least 100, or at least 50, or at least 20, or at least 10, or at least 2 ppmw. The crude BTX stream 29 may comprise at least 5, or at least 10, or at least 25 ppmw of nitrogen containing organic species. The crude BTX stream 29 may comprise at least 10, and at least 50 and at least 100 ppmw oxygenates. The crude BTX stream 29 may comprise at least 50, or at least 500, or at least 1,000 ppmw dienes, and may have a Bromine Number of at least 1, or at least 2, or at least 3.

The hydrotreated BTX stream 29 in FIG. 3 can comprise from 5 to 85%, or from 10 to 70%, or from 20 to 55%, or from 25 to 40% benzene, from 10 to 95%, or from 20 to 80%, or from 30 to 65%, or from 35 to 55% toluene, from 2 to 40%, or from 5 to 30%, or from 10 to 25% xylenes, with ethyl benzene, styrene, and other aromatics each less than 5%, or less than 3%, or less than 1%, and non-aromatic compounds less than 10%, or less than 5%, or less than 3% by weight. The hydrotreated BTX stream 31 may comprise sulfur-containing species of less than 50 ppmw (part per million by weight), or less than 10 ppmw, or less than 1 ppmw. The hydrotreated BTX stream 31 may comprise mercaptan sulfur species of less than 20, or less than 10, or less than 5, or less than 1 ppmw. The hydrotreated BTX stream 31 may comprise thiophene sulfur species of less than 100, or less than 50, or less than 20, or less than 10, or less than 5, or less than 1 ppmw. The crude BTX stream 31 may comprise less than 25, or less than 10, or less than 1 ppmw of nitrogen containing organic species. The hydrotreated BTX stream 31 may comprise less than 100, less than 50, or less than 10, or less than 1 ppmw oxygenates. The hydrotreated BTX stream 31 may comprise less than 1,000, or less than 500, or less than 100 ppmw dienes, and may have a Bromine Index of less than 100, or less than 50, or less than 25. The hydrotreated BTX stream 31 may comprise phenolic species of less than 1, or less than 0.1, or less than 0.01, or less than 0.001 weight percent.

The distillation of the BTX rich stream in 210 can be accomplished by conventional methods using conventional distillation equipment such as tray, bubble cap, packed columns or the like. Distillation may be carried out at subatmospheric pressures or at atmospheric pressures or at higher pressures. Ordinarily, this distillation will be carried out at pressures from 1 to 1,000 kPa, or from 10 to 500 kPa, with pressures from 100 to 400 kPa being preferred.

The benzene and toluene (collectively BT) rich stream 27 that is a product stream of the process. Stream 27 can comprise at least 80%, at least 85%, at least 90%, at least 92%, or from 80 to 99%, or from 85 to 97%, or from 90 to 95% BT by weight. Stream 27 can comprise at least 25%, or at least 30%, or at least 35%, or from 25 to 70%, or from 30 to 60%, or from 35 to 50% benzene by weight. Stream 27 can comprise at least 30%, or at least 35%, or at least 40%, or from 30 to 80%, or from 35 to 70%, or from 40 to 60% toluene by weight. Stream 27 comprises less than 2%, or less than 1%, or less than 0.5% oxygenates by weight, or less than 0.1% oxygenates.

The product stream 28 comprises a mixed xylenes product stream. Stream 28 can comprise at least 50%, or at least 60%, or at least 70%, or from 50 to 95%, or from 60 to 90%, or from 70 to 85% xylenes (p-, o-, and m-xylenes) by weight. Product stream 28 can comprise less than 25%, or less than 20%, or less than 15%, or less than 12%, or from 1 to 25%, or from 3 to 20%, or from 5 to 15% benzene plus toluene by weight. Product stream 28 can comprise less than 20%, or less than 15%, or less than 10%, or from 0.1 to 20%, or from 1 to 15%, or from 5 to 10% naphthalene by weight.

The overhead mixed BT stream is further separated downstream in another fractionation column (not shown), or the benzene and toluene can be separated in this column if the configuration allows it, for example if it is a divided wall column. The BTX separation column 210 functions as a xylene stripper as well as a fractionator. Mixed xylenes leave the bottom of the column for further separation into para-, meta-, and ortho-xylene. Conventional processes for separating the isomers of xylene are known to those skilled in the art.

The heavy hydrocarbon stream that contains C9+ aromatics and other compounds may be used as a diesel, jet, or gasoline blendstock. Optionally the heavy hydrocarbon stream that contains C9+ aromatics and other compounds may be hydrocracked to lighter fractions, separated, and utilized as a diesel, jet, or gasoline blendstock.

Table 6 presents the composition of a typical hydrotreated BTX stream produced by CFP and purified by the inventive process. It is surprising that the concentrations of sulfur, nitrogen, and oxygen containing compounds can be reduced to these very low levels in a CFP product separation and purification process. It is also surprising that the concentrations of benzene, toluene, and xylenes can be maintained at very high levels with the non-aromatics at very low levels in a CFP product separation and purification process, and that the concentrations of benzene, toluene, and xylenes can be maintained at very high levels with the Bromine Index at such a low level in a CFP product separation and purification process.

TABLE 6

Composition of hydrotreated CPF BTX stream.

| | Purified BTX Stream from CFP |
|---|---|
| Composition, wt % | |
| Benzene | 32 |
| Toluene | 47 |
| Xylenes | 16 |
| Ethyl benzene | <1 |
| Styrene | <1 |
| Heavy aromatics, C9+ | <1 |
| Non-aromatics | 1-2 |
| Composition, ppm by weight | |
| Organo-sulfur compounds, ppmw | <1 |
| Mercaptan sulfur compounds, ppmw | <1 |
| Organo-nitrogen compounds, ppmw | <1 |
| Organo-oxygen compounds, ppmw | <1 |
| Bromine index | 20 |

What is claimed:

1. A mixed BTX stream produced from biomass comprising 5 to 85 mass % benzene, 10 to 95 mass % toluene, 2 to 40 mass % xylenes, and sulfur-containing species of less than 10 ppmw (part per million by weight); and with ethyl benzene, styrene, and other aromatics each less than 5 wt % and non-aromatic compounds less than 10 wt %.

2. A mixed BTX stream of claim 1 comprising mercaptan sulfur species of less than 5 ppmw.

3. A mixed BTX stream of claim 2 comprising less than ppmw of thiophenic sulfur species.

4. A mixed BTX stream of claim 2 comprising less than 25 ppmw of nitrogen containing organic species.

5. A mixed BTX stream of claim 2 comprising less than 100 ppmw oxygenates.

6. A mixed BTX stream of claim 2 comprising less than 1,000 ppmw dienes.

7. A mixed BTX stream produced of claim 2 having a Bromine Index of less than 100.

8. A mixed BTX stream of claim 1 comprising less than 1 weight percent of phenolic species.

9. The mixed BTX stream of claim 2 comprising less than 10 ppmw of nitrogen containing organic species; less than 50 ppmw oxygenates; and having a Bromine Index of less than 50.

10. The mixed BTX stream of claim 2 comprising less than 1 ppmw sulfur-containing species.

* * * * *